United States Patent [19]

Fowler

[11] 4,066,514

[45] Jan. 3, 1978

[54] RECOVERY OF NITRATED COMPOUNDS FROM WATER BY DISTILLATION

[75] Inventor: Frank C. Fowler, Kansas City, Mo.

[73] Assignee: Atlas Powder Company, Dallas, Tex.

[21] Appl. No.: 721,773

[22] Filed: Sept. 9, 1976

[51] Int. Cl.$^2$ .......................... B01D 3/10; C07C 77/02
[52] U.S. Cl. .......................................... 203/11; 203/91
[58] Field of Search ......................203/91, 11; 260/467

[56] References Cited

U.S. PATENT DOCUMENTS

| 262,913 | 8/1882 | Armandy | 203/91 |
| 3,620,928 | 11/1971 | Miserlis | 203/91 |
| 3,721,610 | 3/1973 | Chaintron | 203/91 |

FOREIGN PATENT DOCUMENTS 788,946  1/1958  United Kingdom ................ 260/467

Primary Examiner—Leland A. Sebastian
Attorney, Agent, or Firm—Richards, Harris & Medlock

[57] ABSTRACT

A method for separating an aqueous solution which contains minor amounts of nitrated esters which are only slightly soluble in water is provided. Separation of the nitrated esters from the aqueous solution is effected by distilling the aqueous solution at a temperature of from about 50° to about 200° F and a lower than atmospheric pressure. Upon completion of the separation process, water which is substantially free of nitrated esters is suitable for discharge and return to a natural environment.

7 Claims, 1 Drawing Figure

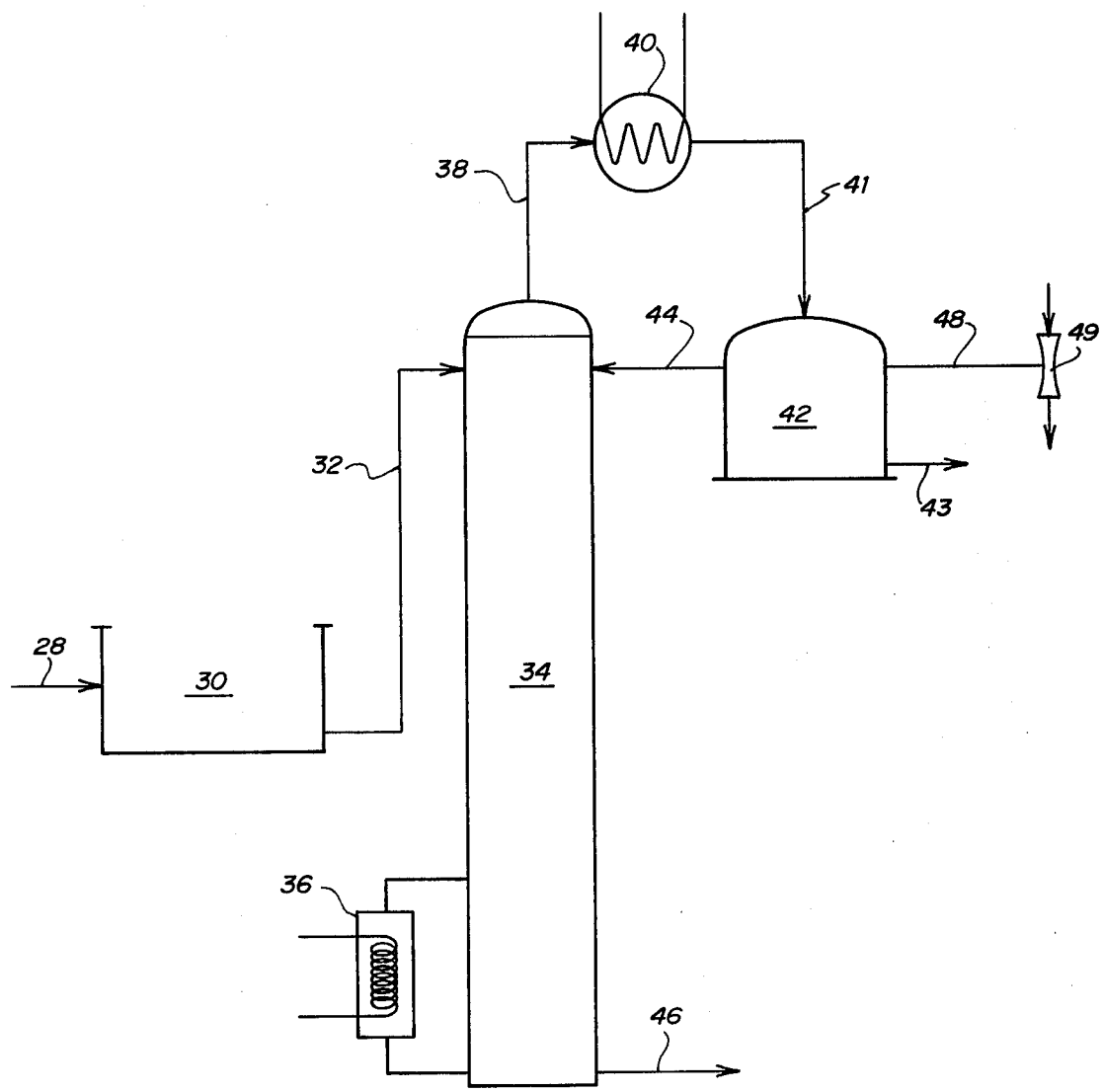

RECOVERY OF NITRATED COMPOUNDS FROM WATER BY DISTILLATION

BACKGROUND OF THE INVENTION

This invention relates to the recovery of nitrated esters from water. In another aspect this invention relates to purification of the wash or process water of explosive manufacturing processes where it is desirable to recover substantially all of the nitrated esters contained in the water prior to its release. Still another aspect of this invention relates to the separation of an aqueous solution which contains minor amounts of nitrated esters of polyalcohols which are only slightly soluble in water.

The commercial production of glyceryl nitrate (also known as nitroglycerin) and ethylene glycol dinitrate, for example, for explosive compositions normally involves operations including nitration, separation of spent nitric acids and purification by neutralization and washing. During the purification and washing steps, large volumes of water are used which come into contact with the nitrated esters. Because the solubility of these nitrated esters in water is very low, the water and a major portion of the nitrated esters can be separated easily. However, a limited quantity of the nitrated esters is dissolved in the wash or process water and heretofore has been discharged with the water phase. Presently, the water effluents only contain the amounts of nitrated esters which can be dissolved in the water. That is, for reasons of safety, the effluent water contains amounts of nitrated esters which do not exceed the saturation point of the water at the temperature at which it is discharged. Recently, however, the Environmental Protection Agency has proposed more stringent effluent limitations and guidelines regarding the maximum COD (chemical oxygen demand) and BOD (biological oxygen demand) which effluents from explosive manufacturing plants may have. See EPA Proposed Regulation, Section 457.10-457.12, 41 Fed. Reg. 10184 (1976). Because COD requirements are directly related to the concentration of the nitrated esters in the effluent water, a process for the removal of nitrated esters which have become dissolved in the water is desirable.

SUMMARY OF THE INVENTION

The present invention provides a process whereby the dissolved portion of nitrated esters which are only slightly soluble in water can be effectively separated from the water thereby lowering the COD requirements of the water and rendering it suitable for discharge to a natural environment. Basically, it has been discovered that aqueous solutions containing dissolved nitrated esters of polyalcohols such as nitroglycerin, ethylene glycol dinitrate, 1,2 propylene glycol dinitrate, and 1,3 propylene glycol dinitrate, for example, which are all characterized as being only slightly soluble in water can be separated by distilling the aqueous solution at temperatures in a range of from about 50° F to about 200° F and preferably in a range of from about 100° F to about 150° F. Pressure during distillation is adjusted to maintain the temperature within these ranges and can vary from about 10 to about 500 mm of mercury. When a conventional distillation column is employed for the distillation process a substantial portion of the nitrated esters of polyalcohols are distilled overhead. The water containing the remainder of the esters leaves the column as bottom product. The overhead vapor contains water, as well as the nitrated esters and upon cooling and condensing these vapors an organic phase of nitrated esters separates from the water and can be recovered as product.

DETAIL DESCRIPTION OF THE INVENTION

Nitrated esters which are produced for use in explosive compositions include, for example, nitroglycerin, ethylene glycol dinitrate, and propylene glycol dinitrate. Generally, the solubility of these nitrated esters in water is characteristically low. For example, the solubility of nitroglycerin in distilled water at 20° C is 0.138 grams per 100 grams of water. The solubility of ethylene glycol dinitrate is 0.68 grams per 100 grams of distilled water at 20° C. Accordingly, separation of the nitrated esters from the water used in explosive manufacturing processes has been heretofore accomplished by allowing the water to separate from the organic liquids in settling tanks and simply withdrawing the water from the top of the settling tank and the nitrated esters from the bottom of the tank. However, some of the nitrated esters do form a true solution with the water and cannot be separated in this manner. The term "slightly soluble" as herein employed refers to nitrated esters which under normal atmospheric pressure and ambient temperatures such as about 25° C will dissolve in water in a quantity of no more than about 1 weight percent of the total solution which corresponds to about 10,000 parts per million.

Because these nitrated compounds have a higher boiling point than water and lower vapor pressures than water separation by distillation appeared impracticable. In spite of these contrary indications, however, it has been discovered that such solutions of water and nitrated esters can be separated by a distillation process carried out at reduced pressures so that the temperature range will be from about 50° to about 200° F. A pressure range of from about 10 to about 500 mm of mercury can be employed for this purpose and a more preferred pressure range is from about 10 to about 150 mm of mercury. The lower limit of the pressures used during distillation will normally be established as a matter of economics in that pressures below about 10 mm of mercury become costly to maintain during the process of distillation. The upper limit of pressures used during the process as a function of safety. The nitrated esters which are being separated are explosive and operation of the process above 500 mm of mercury is not advisable from a safety viewpoint because of the relatively high temperatures at such pressures. The process of distillation can be carried out at a preferred temperature range of from about 100° to about 150° F.

In one preferred embodiment of the present invention, the separation process can be carried out by employing a packed column. It should be noted that when a distillation column is employed, conventional types of plates or trays should be avoided. This is because the explosive compounds being separated may collect on such plates, thereby creating a safety hazard. Because continuous distillation is essentially a stripping type of action the feed is introduced near the top of the column. However, it should be noted that if the process is carried out as a batch process the feed may be fed to a kettle at the base of the column in a conventional manner.

Well known types of packing materials can be employed when the process is performed utilizing a packed column. These include Raschig rings, Lessing rings, Berl saddles, Intalox saddles, Tellerettes, and Pall rings, for example. The column may be completely packed or left partially unpacked. A preferred type of packing is a rolled mesh material fabricated from stainless steel wire and sold under the tradename Goodloe by Packed Column Co. of Edison, N.J.

Upon condensation of the overhead vapors produced by such a distillation process, the nitrated esters will separate from the water and can be drawn off in a conventional manner. Water, which is substantially free of the nitrated esters, can be drawn off the bottom of the distillation column.

The above described process is particularly useful in the separation of nitrated esters of polyalcohols having from about 2 to about 3 carbon atoms. Examples of such nitrated organic compounds include nitroglycerin, ethylene glycol dinitrate, 1,2 propylene glycol dinitrate, and 1,3 propylene glycol dinitrate. One or a combination of several of the foregoing nitrated esters are normally present in the wash or process waters from explosive manufacturing processes and may be separated from the wash or process water using the method disclosed herein.

The drawing depicts a schematic representation of one embodiment of the invention.

The method of the present invention will hereinafter be described in detail with reference to the drawing as applied to a process for separation of nitrated esters from wash or process waters from an explosive manufacturing process. It is to be understood that the broad scope of this invention is not to be limited to the described embodiments herein.

Generally, the manufacture of explosives includes the nitration of various compounds in conventional types of nitration equipment. The effluent from such nitration includes a mixture of acids, nitrated compounds and water. Water may be added, in some cases, at various stages of the manufacturing process and said water is herein referred to as "process water". The effluent from the nitrators is normally passed into neutralizing units where it is contacted with sodium carbonate or other alkali chemicals to neutralize the acids present therein. Water containing such neutralizing chemicals is herein referred to as "wash water". After said neutralization or washing procedure the mixture of water and nitrated compounds is fed to a settling tank or series of settling tanks where the organic phase of the mixture separates from the water phase. Once the organic phase has been separated and recovered the wash and/or process water can be passed by a conduit 28 to a holding tank 30, as depicted in the drawing, where it is allowed to reach ambient temperatures. The wash or process water reaching holding tank 30 contains substantially no undissolved amounts of the nitrated esters and is in fact an aqueous solution of the nitrated esters containing less than about 1 weight percent (10,000 ppm) of said nitrated esters. The aqueous solution containing the nitrated esters is then drawn by a conduit 32 into distillation column 34 near the top of the column. The distillation column can include conventional types of packing which are well known in the industry. The bottom of distillation column 34 is equipped with a reboiler 36, heated by a medium such as water, or steam, for example, where the maximum temperature can be kept below about 200° F. The boil off rate is adjusted so that about 5 to about 80 percent of the feed is vaporized. For example when a mixture of ethylene glycol dinitrate and nitroglycerin is being separated and the ethylene glycol dinitrate comprises a major portion of the nitrated esters a boil off rate of from about 5 to about 30 percent can be employed. The vapor containing nitrated esters and water is drawn off the top of the column by a conduit 38 and is passed through a conventional condensing unit 40 and conduit 41 and is collected in distillate collection tank 42. The water phase of the condensed distillate will separate from the nitrated ester phase of the distillate and can be returned to the top of distillation column 34 by conduit 44 if desired. The condensed nitrated ester phase of the distillate may be drawn off the bottom of distillate collection tank 42 via conduit 43. Water, which is substantially free of any nitrated esters can be withdrawn as bottom product from distillation column 34 by a conduit 46. Water processed in this manner can have the content of nitrated esters lowered to below 500 ppm. A vacuum source 49 sufficient to allow operation of the distillation column at pressures from about 10 mm of mercury to about 500 mm or mercury is connected to the system by a vacuum line 48 which leads to distillate collection tank 42.

EXAMPLES

The following examples are set forth in order that one skilled in the art may better appreciate the subject invention. The examples are intended as exemplary only and are not to be understood to limit the present invention in any manner.

EXAMPLE 1

A distillation column, having a length to diameter ratio of 48 was filled with packing material manufactured from stainless steel wire and sold under the Trademark "Goodloe" by the Packed Column Company of Edison, N.J. The column was equipped with a kettle heated by hot water. The column was initially charged with 250 parts distilled water to bring it up to operating conditions. Water containing 3,680 ppm of ethylene glycol dinitrate and about 500 ppm nitroglycerin was then continuously fed into the top of the column which was maintained at a pressure of 100 mm of mercury. The process was carried on continuously and 224 parts by volume of the water containing the nitrated esters was distilled. The overhead temperature was recorded at 126° and bottom temperature was 129° F. The overhead product was fed to a condenser operating at approximately 75°. The cooled and condensed ester phase was removed from the system and the water phase was returned to the column. After 75 minutes of continuous distillation with total reflux, a sample of the kettle product was withdrawn and analysed by gas chromotography. Analysis of the bottom product revealed that the ethylene glycol dinitrate concentration had been lowered to 26 ppm and the nitroglycerin concentration had been lowered to 227 ppm. This represents a 98+% reduction in the ethylene glycol dinitrate content.

EXAMPLE 2

A distillation column adapted for batch distillation, and having a length to diameter ratio of 10.5 was used in this experiment and was left unpacked. 300 parts of water containing 5,460 ppm of ethylene glycol and 130 ppm nitroglycerin were placed in a kettle at the bottom of the column and heated to 128° F. Pressure within the column was kept between 100 and 96 mm of mercury and the overhead temperature was measured at 126° F. The overhead product of 43 parts was cooled and collected by a common type of condenser unit which operated at approximately 75° F. At the end of 35 minutes, a sample of the kettle product was withdrawn and analysed by gas chromotography. The bottom product analysis revealed that the ethylene glycol dinitrate content of the waste water had been lowered to 748 ppm and the nitroglycerin content had been lowered to 95 ppm. This represented an 86+% reduction in ethylene glycol dinitrate content.

EXAMPLE 3

A distillation column, having a length to diameter ratio of 10.5 was packed just over halfway full with stainless steel wire packing material sold under the Trademark "Goodloe" by the Packed Column Company, Edison, New Jersey. The column was initially charged with 150 parts of distilled water in order to attain operating temperatures and pressures. When the operating conditions reached 101 mm of mercury of pressure, 127° F overhead temperature and 127° F bottom temperature, 237 parts of water containing nitrated esters were fed continuously to the column. The water had been previously analyzed by gas chromatography and contained 5,460 ppm ethylene glycol dinitrate and 130 ppm nitroglycerin. The overhead product of 60 parts was collected and cooled via a condenser which was operated at about 75° F. After 20 minutes of continuous distillation under these conditions, a sample of the kettle product was withdrawn and analyzed. The kettle product was found to contain 204 ppm ethylene glycol dinitrate and 43 ppm nitroglycerin. The reduction in ethylene glycol dinitrate content was, therefore, 87+%.

While this invention has been explained in relation to its preferred embodiment, it is to be understood that various modifications thereof will now become apparent to those skilled in the art upon reading the specification and it is intended to cover such modifications as fall within the scope of the appended claims.

I claim:

1. A method for separating nitrated esters from a water solution which contains less than about 1 weight percent of nitrated esters of polyalcohols having from about 2 to about 3 carbon atoms comprising:
   a. passing said water solution into a distillation zone and heating said water to a temperature of from about 50° to about 200° F at a lower than atmospheric pressure in the range of from about 10 to about 500 mm of mercury;
   b. withdrawing a vapor stream comprising said nitrated esters and water from the top of said distillation zone;
   c. cooling said vapor stream in a cooling zone to condense said water and said nitrated esters to form a water phase and a nitrated ester phase;
   d. separating said condensed water phase from said nitrated ester phase;
   e. withdrawing the bottom product of said distillation zone which comprises water which is substantially free of said nitrated esters.

2. The method of claim 1 wherein said nitrated esters of polyalcohols are selected from the group consisting of nitroglycerin, ethylene glycol dinitrate, propylene glycol dinitrate and mixtures thereof.

3. The method of claim 1 wherein said water solution is continuously passed to said distillation zone.

4. The method of claim 1 further comprising passing said condensed water phase separated in step (d) back to said distillation zone.

5. The method of claim 1 wherein said water solution is continuously passed into the upper section of a packed distillation zone.

6. The method of claim 5 wherein from about 5 to about 80% of water solution is vaporized in said packed distillation zone.

7. The method of claim 5 wherein said nitrated esters are polyalcohols selected from the group consisting of nitroglycerin, ethylene glycol dinitrate, propylene glycol dinitrate and mixtures thereof.

* * * * *

UNITED STATES PATENT AND TRADEMARK OFFICE
CERTIFICATE OF CORRECTION

PATENT NO. : 4,066,514
DATED : January 3, 1978
INVENTOR(S) : Frank C. Fowler

It is certified that error appears in the above-identified patent and that said Letters Patent are hereby corrected as shown below:

Abstract, line 7, change "50°" to --50°F--.

Col. 2, line 38, change "50°" to --50°F--;
      line 47, change "process as" to --process are set as--;
      line 53, change "100°" to --100°F--.

Col. 3, line 7, change "N.J." to --New Jersey--.

Col. 4, line 36, change "N.J." to --New Jersey--;
      line 46, change "126°" to --126°F--;
      line 48, change "75°" to --75°F--.

Col. 6, line 7, (Claim 1), change "50°F to --50°F--.

Signed and Sealed this

Tenth Day of October 1978

[SEAL]

Attest:

RUTH C. MASON
*Attesting Officer*

DONALD W. BANNER
*Commissioner of Patents and Trademarks*